United States Patent
Smartt et al.

(10) Patent No.: US 10,572,786 B1
(45) Date of Patent: Feb. 25, 2020

(54) NON-CONTACT RAPID READER SYSTEM FOR REFLECTIVE PARTICLE TAGS

(71) Applicants: National Technology & Engineering Solutions of Sandia, LLC, Albuquerque, NM (US); Keith Tolk, Albuquerque, NM (US)

(72) Inventors: Heidi A. Smartt, Albuquerque, NM (US); William C. Sweatt, Albuquerque, NM (US); Michael B. Sinclair, Albuquerque, NM (US); Michael McDaniel, Albuquerque, NM (US); Juan A. Romero, Bayfield, CO (US); Keith Tolk, Albuquerque, NM (US)

(73) Assignees: National Technology & Engineering Solutions of Sandia, LLC, Albuquerque, NM (US); Keith Tolk, Albuquerque, NM (US)

( * ) Notice: Subject to any disclaimer, the term of this patent is extended or adjusted under 35 U.S.C. 154(b) by 0 days.

(21) Appl. No.: 16/140,694

(22) Filed: Sep. 25, 2018

(51) Int. Cl.
*G06K 19/06* (2006.01)
*G21K 1/00* (2006.01)

(52) U.S. Cl.
CPC .. *G06K 19/06112* (2013.01); *G06K 19/06131* (2013.01); *G21K 1/006* (2013.01); *G06K 2019/0629* (2013.01)

(58) Field of Classification Search
CPC ............... G06K 19/06112; G06K 19/06131
USPC .................................................. 235/462.42
See application file for complete search history.

(56) References Cited

U.S. PATENT DOCUMENTS

| | | | |
|---|---|---|---|
| 5,939,716 A | 8/1999 | Neal | |
| 9,930,307 B1* | 3/2018 | Kursula | H04N 17/002 |
| 2012/0243797 A1* | 9/2012 | Di Venuto Dayer | G06K 9/00577 382/218 |
| 2016/0350996 A1* | 12/2016 | Noh | B42D 25/41 |

* cited by examiner

*Primary Examiner* — Toan C Ly
(74) *Attorney, Agent, or Firm* — Daniel J. Jenkins

(57) ABSTRACT

A reflective particle tag reader system includes a read head assembly having a camera, illuminators, and a rigid frame portion for supporting the camera and the illuminators. The illuminators illuminate a focal point located opposite the camera where a reflective particle tag is placed. A computer in data communication with the camera receives and store images of the reflective particle tag that are acquired by the camera. The computer is programmed to process video images and to quantify a positional alignment parameter and an angular alignment parameter of the reader with respect to the reflective particle tag. A rapid burst of image frames is obtained in response to the positional alignment and the angular alignment parameters being within a predetermined tolerance and identity of the reflective tag is established between a first image set and a second image set.

14 Claims, 4 Drawing Sheets

NON-CONTACT RAPID READER SYSTEM FOR REFLECTIVE PARTICLE TAGS

STATEMENT REGARDING FEDERALLY SPONSORED RESEARCH OR DEVELOPMENT

This invention was developed under Contract No. DE-NA0003525 awarded by the United States Department of Energy/National Nuclear Security Administration. The Government has certain rights in this invention.

BACKGROUND OF THE INVENTION

The application generally relates to a system and method for a non-contact rapid reader system for reflective particle tags, or labels, (RPT) applied to containers and other articles for monitoring. Containment and surveillance measures are critical to any verification regime in order to monitor certain highly secured and restricted activities, e.g., transportation of nuclear fuel and its components across international borders; to detect undeclared activities related to national security and restricted activities; to verify the integrity of equipment or items; to reduce inspector burden; and to maintain a chain of custody between inspections.

A tag is an exemplary measure used to establish the identity of an accountable item and maintain the chain of custody for the respective item. Tags must also provide evidence of tampering of the tag itself, e.g., counterfeiting or substitution, and if applied in an appropriate manner, e.g., across a seam of a container, a tag may also provide evidence of tampering with the item. Continual improvement of measures such as tags is required to counteract technical advances of adversaries which could render C/S equipment obsolete with a single technical advancement. Furthermore, new architectures are required to respond to changing requirements arising from the introduction of new procedures or approaches, and it is often desirable to incorporate technological advances that provide efficiency gains or allow deployment in new application spaces.

The RPT was developed to identify items that must be accounted for under international treaties. In most instances the tag, or RPT, is composed of an article with unique optical characteristics, e.g., specular hematite particles randomly dispersed in a clear, adhesive polymer matrix.

Reflective particle tags (RPT) derive their unique identities through utilization of thousands of microscopic reflective elements randomly suspended in a clear adhesive matrix. For verification of the authenticity, an illumination/imaging system is used to "read" information about precise positions and orientations of faceted particles. SNL developed the original Reflective Particle Tag (RPT) system, comprising a tag and an imager, in the 1990's to identify treaty-accountable items. Since then, the RPT system has evolved with advances in computing, imaging, and materials, and is considered a robust, low-cost, hard-to-counterfeit passive tagging system for treaty verification. However, a limitation of the current system is the need to mechanically dock the reader with the tag, which prevents its use in many situations. This paper discusses R&D at SNL to develop a non-contact handheld imaging system that will allow RPT system use in new scenarios and allows automation.

The RPT architecture is effective for detection of counterfeiting and removal of tags. Furthermore, RPTs require no power source, and maintain stability through temperature extremes, rough handling, and years of service. Such attributes make RPTs suitable for applications with strict facility acceptance requirements and for deployments in which a semi-permanent tag should be attached to an item to be monitored. However, the current RPT system referred to as a contact-type RPT system, suffers from certain deficiencies that limit potential applications. The contact-type RPT derives its security capability through precise alignment between a reader and the RPT, and relies on tightly collimated illumination beams and a small aperture to allow only facets oriented within approximately one degree of the optimal direction to contribute to the recorded image. In order to achieve such precision, the reader must be placed in contact with the flat frame in which the RPT is mounted or attached. However, such physical contact may be undesirable or not permitted by a facility owner. In addition, the use of a flat frame is incompatible where tags must be affixed to complex geometries and curved surfaces.

What is needed is a system and/or method for rapidly testing and evaluating optical designs of computational and compressive imaging sensing (CS) systems. The term compressive sensing (CS) is used interchangeably with computational imaging, for purposes of this disclosure.

BRIEF SUMMARY OF THE INVENTION

One embodiment relates to a reflective particle tag reader system including a read head assembly. The read head assembly has a camera, illuminators, and a rigid frame portion for supporting the camera and the illuminators. The illuminators are mounted to the frame and directed to illuminate a focal point located opposite the camera. The focal point is where a reflective particle tag is place. A computer having a display, a processor, a data communication input and output means, and a data storage device is in data communication with the camera to receive and store images of the reflective particle tag that are acquired by the camera. The computer is programmed to process video images and to quantify a positional alignment parameter and an angular alignment parameter of the reader with respect to the reflective particle tag. A rapid burst of image frames is obtained in response to the positional alignment and the angular alignment parameters being within a predetermined tolerance and identity of the reflective tag is established between a first image set acting as an authenticating reference and a second image set used for verification.

Another embodiment relates to a read head assembly having a camera, illuminators, and a rigid frame portion for supporting the camera and the illuminators. The illuminators are mounted to the frame and directed to illuminate a focal point located opposite the camera.

Yet another embodiment discloses a non-transitory computer-readable storage medium having stored thereon instructions which, when executed by one or more processing units, cause the one or more processing units to perform a method for maintaining and verifying authenticity of a reflective particle tag. The method includes illuminating a focal point located opposite the camera, placing a reflective particle tag at the focal point, receiving by a computer in data communication with a camera one or more images of the reflective particle tag acquired by the camera, processing video images and quantifying a positional alignment parameter and an angular alignment parameter of the reader with respect to the reflective particle tag, obtaining a rapid burst of image frames in response to the positional alignment and the angular alignment parameters being within a predetermined tolerance; and authenticating an identity of the reflective tag between a first image set and a second image set.

The disclosed invention overcomes a number of deficiencies present in a contact-type RPT system by providing a handheld tag reader and associated computational hardware capable of identifying an RPT without coming into physical contact with the RPT. In addition, the disclosed RPT reader system is compatible for reading tags attached to items having complex geometries, such as curves or ridges, and reduces the time required for inspection in harsh or environmentally restricted locations. The RPT reader system further provides the capability to automate repetitive tasks, e.g., reading RPTs attached to cylinders with uranium hexafluoride ($UF_6$) for use in nuclear fuel processing and enrichment.

The disclosed handheld reader system combines many characteristics of the contact RPT system such as utilization of multiple illumination angles to record unique images of only those particles whose orientations match the reflection criterion. However, since a non-contact handheld system may be compromised by motion and misalignment introduced by the equipment operator, the new system reduces reliance on precise registration of the imager with the tag. While it is desirable to provide the greatest precision possible in terms of alignment, an advantage of the disclosed RPT reader system is the ability to recognize when an acceptable alignment condition has been momentarily achieved.

Another advantage of the RPT reader system is resistance to counterfeiting and removal without detection.

The handheld RPT reader includes an optical system and vision processing software allows the acquisition of high quality images without direct contact with the RPT. The disclosed embodiments rely on a handheld read head in data communication with a processing device, e.g., a desktop computer or tablet computer, having special purpose circuit boards.

Alternative exemplary embodiments relate to other features and combinations of features as may be generally recited in the claims.

BRIEF DESCRIPTION OF THE DRAWINGS

The application will become more fully understood from the following detailed description, taken in conjunction with the accompanying figures, wherein like reference numerals refer to like elements, in which.

DETAILED DESCRIPTION OF THE INVENTION

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

Figure 1:
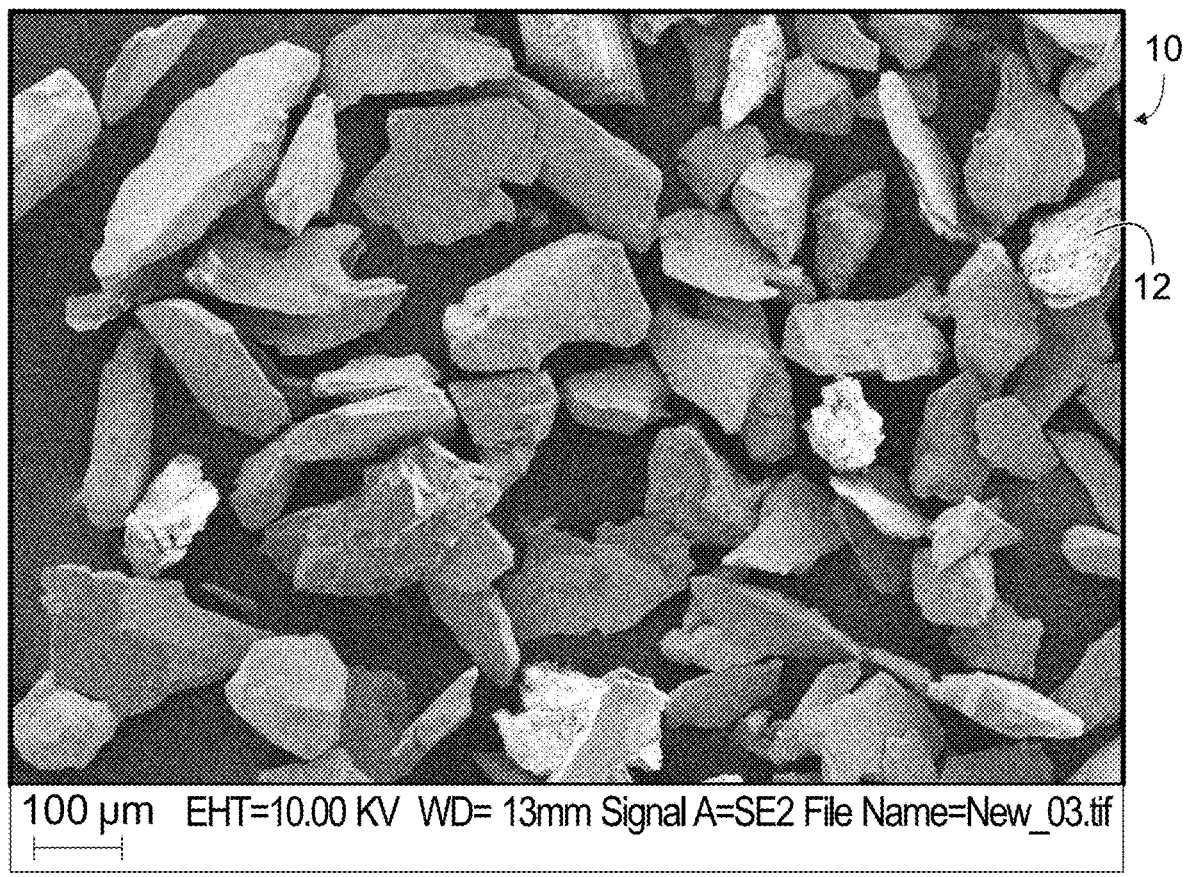
FIG. 1 shows a scanning electron microscope image of the faceted specular hematite particles used in the RPT system.
Figure 4:
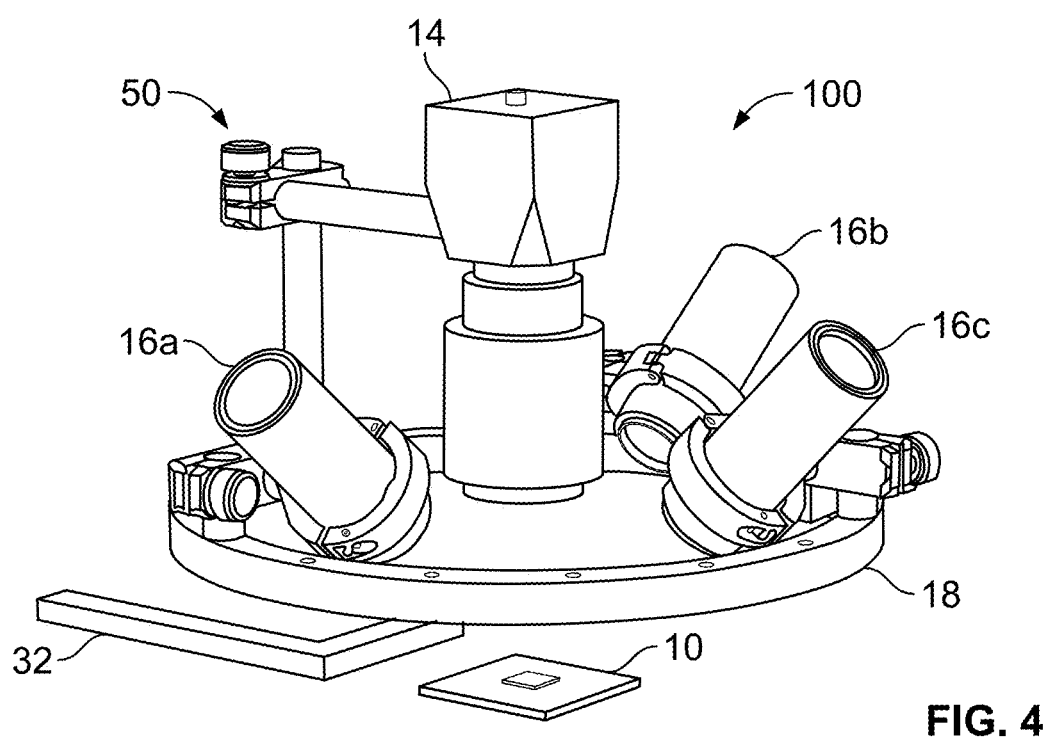
FIG. 4 illustrates an RPT reader according to an embodiment of the disclosure.

Referring to FIG. 1, a scanning electron microscope image of the faceted specular hematite particles 12 used in the RPT system 100 (FIG. 4). FIG. 1 shows a magnified view of a commonly used RPT 10 including hematite particles 12 with dimensions approximately 80 µm with flat, reflective facets.

Figure 2:
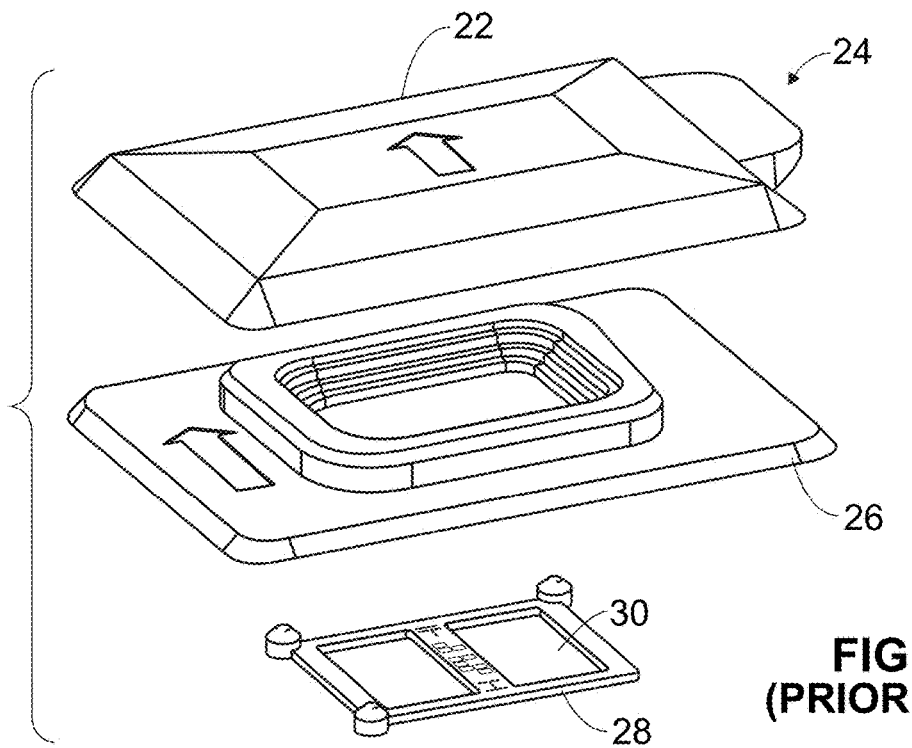
FIG. 2 shows an RPT tag assembly for a contact-type cover, docking frame, and RPT frame.

FIG. 2 shows an exploded view for an exemplary RPT assembly 24 for a prior art contact-type RPT. A cover portion 22 is placed over a docking frame 26 to protect RPT 10 from damage. A tag frame 28 supports RPT 10 in aperture and attaches to docking frame 26. Docking frame 26 rigidly supports a reader for alignment with RPT when reading patterns associated with RPT. Frames 28 held the read head securely in place since the data processing was slow, and "on the fly" image capture was previously not possible.

Figure 3:
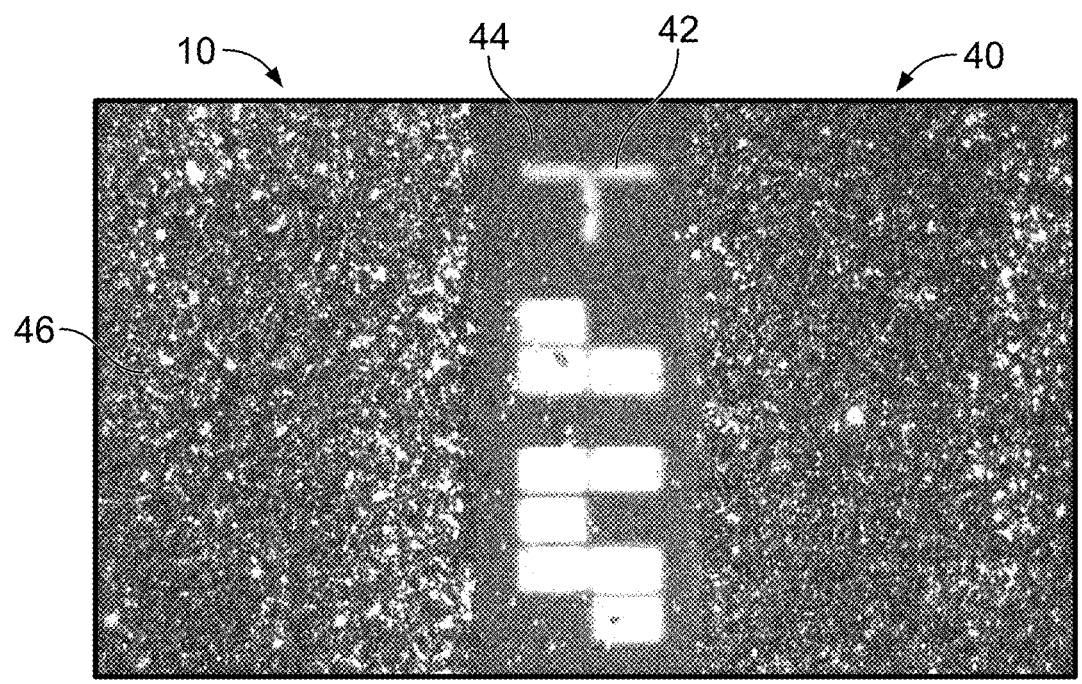
FIG. 3 shows reflective particle tag having a strip located in the middle of the tag representing a unique binary code identification.

In a contact-type prior art RPT system, in order to inspect tag 10, reader 100 is physically attached to a frame 18 for precise alignment and records images using each of the four illuminators. For each of the illumination angles, only a subset of the hematite facets will be oriented in such a manner as to redirect the incident illumination beam toward the aperture of the camera, collectively referred to as the reflection criterion. This subset will appear as small bright spots in a recorded image 40 as shown in FIG. 3. In this manner, a sequence of four complex and highly unique patterns 46 may be recorded and stored in a data storage device (not shown). The recorded patterns 46 may be used to physically authenticate the tag at a later date. Optionally, a unique, barcode-like identifier (ID) 42 may be placed at a center line 44 of RPT 10 to identify RPT 10 (FIG. 3) and allow rapid retrieval of reference images. Once a tag is set, an inspector can return to the item, attach the reader, compare barcode or other IDs 42, then reflective patterns 46 in order to determine if tag 10 patterns 46 are a match.

As shown in FIG. 4, an RPT reader 100 includes a camera 14 and multiple collimated illuminators 16a, 16b, 16c, arranged at different angles with respect to RPT 10. While three illuminators are shown in the exemplary embodiment, more or fewer illuminators may be used as desired for the application. Likewise, other parametric values used in the embodiments described herein are provided by way of example and not limitation. In another embodiment, a color charge-coupled device (CCD) and three LEDs that are red, green, and blue may be used as illuminators. In this embodiment, the system can capture images from the three LEDs simultaneously to increase system speed.

A schematic diagram of the read head 50 of the RPT system 100 is shown in FIG. 4. A read head 50 includes a rigid, preferably light-weight circular frame portion 18 with handles 32. Three high-power LED illuminators 16a, 16b, 16c, are mounted to the frame and aimed toward a point approximately 10 cm below the center of circular frame portion 18. In contrast to the tightly collimated illumination beams of the contact RPT system, the illuminators of the new system project approximately F/2 beams—representing a ratio of the system's focal length to the diameter of the aperture—containing a larger range of illumination angles. This is achieved using collimation optics and diffusers. The LEDs of illuminators 16 emit light in a relatively narrow spectral band so that can be filtered by a narrow bandpass filter (not shown) to reject most of the ambient illumination. The illuminators 16 may be individually or simultaneously powered. In one embodiment, illuminators 16 may be rapidly strobed sequentially. In one embodiment, the bandpass filter may be a flat plate of colored glass mounted in front of the camera lens, e.g., if the illuminators 16 produce light at a wavelength λ=440 nm, a filter passing 440 nm+/−10 nm will block >95% of the visible light.

Computer Vision System:

For obtaining near optimum alignment of reader 100 with RPT 10, a high frame-rate computer vision processing system (not shown) quantifies positional and angular alignment errors of the reader with respect to RPT 10. With each frame, a set of fiducials is projected on the display screen to assist the operator or inspector to improve the alignment of reader 100. When the alignment satisfies a predetermined criterion, a rapid burst of image frames is obtained to be used for verification of the image sets. Thus, the computer vision system essentially comprises two major components— alignment and verification. In one embodiment, the rapid burst of camera images is obtained while in synchronization with the strobing of the illuminators.

Figure 5:
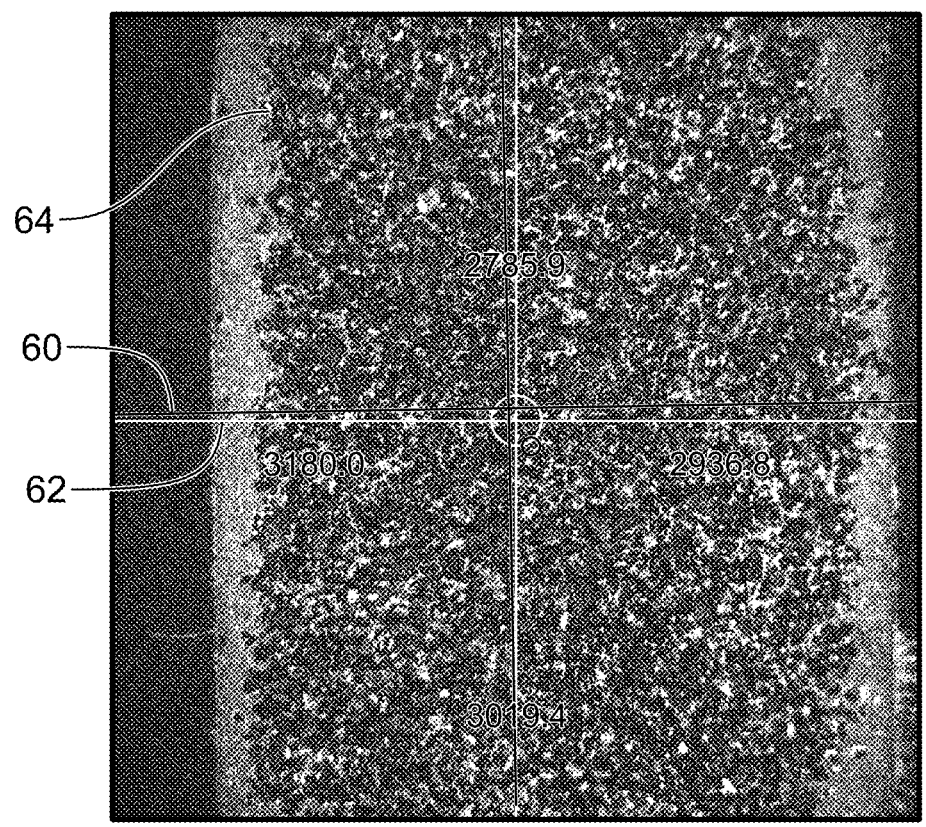
FIG. 5 illustrates a view from the computer vision system of an RPT according to an embodiment of the disclosure.

FIG. 5 illustrates a view from the computer vision system of an RPT according to an embodiment of the disclosure. Referring next to FIG. 5, the computer vision system relies on image features and focus measures that are recorded at the time an RPT 10 is attached to an item for tracking. For each RPT, a set of features, or data set, in particular features calculated using the Speeded Up Robust Features, or SURF, algorithm, their descriptors and focus measures is stored on RPT system 100 computer. The SURF algorithm is well known in the art and provides a local feature detector and descriptor. SURF is used for tasks such as object recognition and image registration. Its feature descriptor is based on the sum of the Haar wavelet response around the point of interest.

During alignment, the vision system analyzes each new frame, or image, recorded by camera 14 and rapidly acquires a new set of image features for the incoming image. The acquired features are compared to the stored features, and, using only features that provide a good match between the current and stored feature sets, a homography matrix is calculated which provides the lateral displacement and azimuthal rotation between the acquired features and stored features. A pair of crosshair fiducials 60, 62 (FIG. 6) is projected on the computer screen, with one crosshair 60 representing the coordinate system of an imager chip and the other crosshair 62 representing the coordinate system of the stored feature set. When the fiducials 60, 62 are aligned, three of six possible degrees of orientation and rotation are aligned. Degrees of freedom include the lateral position in the plane of the tag and the in-plane rotation. The remaining degrees of freedom are the 2-D tilt of the plane and the focus. The remaining three degrees of freedom are aligned using the currently acquired set and the corresponding stored set of focus measures. Each of these focus measures is obtained at a different spatial location within the image 64. If the reader 100 is angled relative to the conditions that were used for the stored data, then better focus measures will be obtained for some regions of the image 64 than other regions. Other parts of image 64 are sharply imaged on frames that are near in time. A balance bubble fiducial may be projected on the computer display to indicate relative balance of all the focus measures. When the cross-hair fiducials are matched and the balance bubble is centered, then all degrees of freedom have been aligned. FIG. 5 shows a screenshot of the computer display with the projected fiducials for the tag reader application during the alignment phase. Red and green crosshairs are used in one embodiment to distinguish from one another. Green crosshairs 60 are aligned with the imager and red crosshairs 62 are aligned with the tag. Red and green circles 68, 70 indicate the focus and tilt errors. When the crosshairs 60, 62 overlap within a pre-specified error tolerance, and circles 68, 70 are centered at the origin, the system acquires a rapid burst of high resolution images that can be used for verification. Alternatively signals or schemes other than fiducials may be used to characterize the quality of the alignment and focus for verification purposes.

Figure 6:
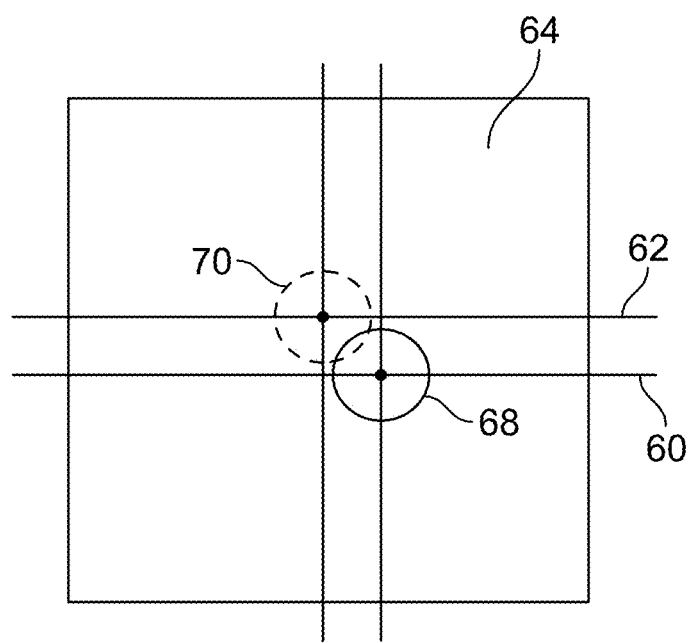
FIG. 6 illustrates a set of fiducials overlaying a blank image for contrast.
Figure 7:
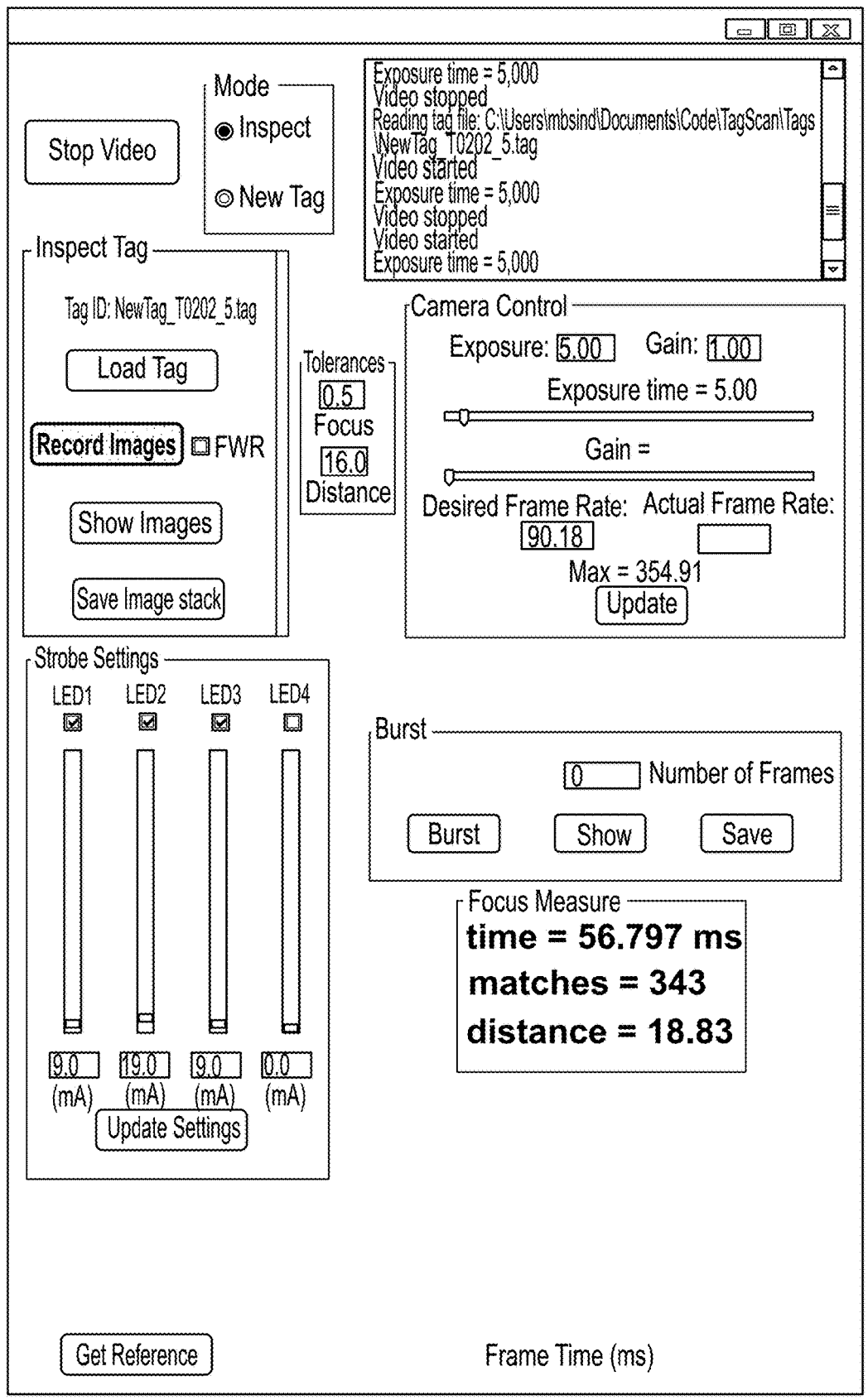
FIG. 7 illustrates a display screen for adjusting and displaying fiducial parameters, settings and controls for the operator according to an embodiment of the disclosure.

FIG. 6 shows a set of fiducials overlaying a blank image for contrast. FIG. 7 is a display screen for adjusting and displaying fiducial parameters, settings and controls for the operator. In practice it may not be possible for an operator to perfectly align the fiducials 60, 62, so a predetermined set of tolerances is utilized to determine whether the alignment of fiducials 60, 62 is sufficiently close to allow image acquisition and verification of the tag. Using binned images to reduce the data set size eightfold, the system software can complete the image analysis and fiducial projection at a rate of 25 frames per second. During this alignment phase, all three illuminators 16a, 16b, 16c, may be constantly illuminated.

Once the computer vision system deems that the alignment is appropriate, the system acquires a burst of ~100 full resolution (2048×2048) frames at a rate of 90 frames per second. In one embodiment, during the burst acquisition, illuminators 16 are sequentially strobed to allow acquisition of frames using each illumination condition. Preferably, to obtain maximum acquisition speed for frames, vision processing tasks are performed after the burst occurs. After the burst acquisition, the image sequence is analyzed based, e.g., the best focus measures and the top four images per illumination condition are retained for a total of twelve images per acquisition. These high-quality frames are saved and are further processed using another SURF algorithm for verification processing. The ability to align the reader with the tag and acquire images for verification is sufficient for tag verification; however, full resolution images provide a more rigorous verification procedure where increased confidence may be desired.

The security of an RPT system 100 depends upon a number of factors including: the number of particles appearing in each image; the angular tolerance for satisfying the reflection criterion (i.e., how much of the light is specularly reflected from a facet and collected by the camera lens); the positional tolerance for locating the centroid of a facet; and the amount of spatial information related to the shapes and sizes of the facets. The handheld system differs in several important aspects from that of the contact-type RPT system. It is not possible to determine an absolute relative comparison value for the handheld vs. non-contact system security, since a variable element of system security depends upon how difficult it would be for an adversary to replicate an existing tag. An exemplary estimate of security may be based on the number of particles within the images, their angular and positional tolerances, and a shape information factor. To do this, a security figure of merit representing confidence in the uniqueness of a tag image is defined as:

$$S = \frac{N \cdot P}{(\Delta\theta)^5 \cdot (\Delta x)^2} \qquad \text{Equation 1}$$

where N is the number of particles appearing in the images, P is the number of degrees of freedom describing the shape of the particle, ΔO is the measurement tolerance of the particle's tilt angles, and Δx is the measurement tolerance of the particle's centroid. It is assumed that the camera images, e.g., a 15 mm×15 mm field of view. Also, assume the tag utilizes hematite particles with an average size of ~80 micrometers (μm). Other parameters of the two RPT systems for estimated values are shown in table 1:

TABLE 1

|  | Contact RPT System | Non-Contact Handheld RPT System |
|---|---|---|
| Imager size | 1.3 MP | 4 MP |
| Object space f-number | 8.4 | 5.6 |
| Number of illuminators | 4 | 3 |
| Illuminator f-number | 20 | 2 |
| Resolvable spot diameter (referred to tag plane) | 19 μm | 12 μm |

The average number of particles that will appear in each image depends upon the f-numbers of the illuminators and the camera lens, and is greater by a factor of ~12 for the handheld RPT system due to its faster optics. However, the increased average number of particles carries with it a factor of ~3.5 loosening of the measurement tolerance of the particle's tilt angle which is $\Delta\theta \approx \pm 1.7$ degrees for the contact RPT system and $\Delta\theta \approx \pm 6$ degrees in the handheld system. Note that since the number of particles visible in the images scales as the square of the angular tolerance factor, these factors will cancel in the comparison of the security figures of merit.

The higher spatial resolution of the non-contact handheld system directly leads to a larger number of degrees of freedom describing the shapes of the particles. To estimate this effect, an average particle patch of 300 μm is assumed in order to account for irregularities in particle shape. Using resolvable spot diameters for the two systems presented in the table, we obtain the number of resolution elements along the perimeter as P=25 for the non-contact handheld reader, and P=16 for the contact RPT. In a similar fashion, the improved spatial resolution of the non-contact handheld reader allows the particle centroids to be determined more precisely. This is partly due to the smaller resolution element size and partly due to the larger number of resolution elements appearing on the surface (perimeters of the particles). The centroid positions can be estimated to an accuracy of $\Delta x \approx \pm 3.4$ μm for the handheld system and $\Delta x \approx \pm 6.7$ μm for the contact RPT system.

Assembling these estimates yields a security figure of merit, S, for the non-contact type handheld reader is greater than that of the contact RPT by a factor of three.

Although the exemplary embodiments disclosed herein refer to hematite as the reflective particle tag, any crystalline material that tends to fracture so as to leave flat faces is possible. The refractive index of the crystal is preferably significantly different than that of the plastic (n~1.5) in which the crystals are captured. Also, metallic crystal material, e.g., pyrite, as well as dielectric materials like diamond, sapphire, Graphite, Ge, Si, and rare materials, Ho—Mg—Zn, may be substituted for hematite. Facet sizes are preferably 20 microns <D<~200 microns.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processor, or by a special purpose computer processor for an appropriate system, incorporated for this or another purpose or by a hardwired system.

It is important to note that the construction and arrangement of the non-contact reflective particle tag reader system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

As noted above, embodiments within the scope of the present application include program products comprising machine-readable media for carrying or having machine-executable instructions or data structures stored thereon. Such machine-readable media can be any available media which can be accessed by a general purpose or special purpose computer or other machine with a processor. By way of example, such non-transitory machine-readable media can comprise RAM, ROM, EPROM, EEPROM, CD-ROM or other optical disk storage, magnetic disk storage or other magnetic storage devices, or any other non-transitory computer-readable medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a non-transitory machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the figures herein may show a specific order of method steps, it is understood that the order of these steps may differ from what is depicted. Also, two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps.

The invention claimed is:

1. A reflective particle tag reader system comprising:
   a read head assembly, the read head assembly comprising a camera, a plurality of illuminators, and a rigid frame portion for supporting the camera and the plurality of illuminators;
   the plurality of illuminators mounted to the frame and directed to illuminate a focal point located opposite the camera, the focal point being the location of the reflective particle tag;
   a computer having a display, a processor, a data communication input and output means, and a data storage device; the computer in data communication with the camera to receive and store one or more images of the reflective particle tag acquired by the camera; and
   the computer configured to process video images and to quantify a positional alignment parameter and an angular alignment parameter of the reader with respect to the reflective particle tag;
   wherein a rapid burst of image frames is obtained in response to the positional alignment and the angular alignment parameters being within a predetermined tolerance and identity of the reflective tag is established between a first image set and a second image set.

2. The system of claim 1, wherein, the one or more images of the reflective particle tag further comprises a high-frequency sequence of camera images, the camera having an aperture in synchronization with a strobe frequency of the illuminators to obtain the high-frequency sequence of camera images of the reflective particle tag.

3. The system of claim 1, further comprising a bandpass filter connected to the camera, the bandpass filter configured to reject ambient illumination and pass light emitted in a narrow spectral band.

4. The system of claim 1, wherein a set of fiducials is projected on the display screen to determine alignment of the camera with respect to the reflective particle tag.

5. The system of claim 1, wherein a set of features for each image is calculated via an algorithm, descriptors defining the features, and focus measures; and wherein the set of features is stored on the computer.

6. The system of claim 1, wherein during alignment, the computer further comprises a vision system, the vision system configured to analyze each image recorded by the camera and acquire a set of image features associated with respective image; compare the acquired features to the stored features, and calculate a homography matrix to provide a lateral displacement and azimuthal rotation between the acquired image feature set and stored feature set.

7. The system of claim 6, wherein a pair crosshair fiducials is projected by the visions system on the display screen; a first fiducial representing the coordinate system of an image collected on an imager chip and a second fiducial representing a coordinate system of the stored feature set.

8. The system of claim 5, wherein alignment of the first and second fiducials provides alignment of three degrees of orientation and rotation; and wherein the remaining three degrees of freedom are aligned using the acquired image feature set and the corresponding stored set of focus measures.

9. The device of claim 8, wherein each of the focus measures is acquired at a different spatial location within the respective image; and wherein if the reader is positioned at an angle relative to the conditions that were used for the stored data, then better focus measures will be obtained for some portions of the image relative to other portions of the same image.

10. The system of claim 9, wherein a balance bubble fiducial is projected on the display to indicate relative balance of all the focus measures, and wherein all degrees of freedom are aligned when the first and second fiducials are matched and the balance bubble is centered over the first and second fiducials.

11. A non-transitory computer-readable storage medium having stored thereon instructions which, when executed by one or more processing units, cause the one or more processing units to perform a method for maintaining and verifying authenticity of a reflective particle tag comprising:
    illuminating a focal point located opposite the camera;
    placing a reflective particle tag at the focal point;
    receiving by a computer in data communication with a camera one or more images of the reflective particle tag acquired by the camera;
    processing video images and quantifying a positional alignment parameter and an angular alignment parameter of the reader with respect to the reflective particle tag;
    obtaining a rapid burst of image frames in response to the positional alignment and the angular alignment parameters being within a predetermined tolerance; and
    authenticating an identity of the reflective tag between a first image set and a second image set.

12. The non-transitory computer-readable storage medium of claim 11, wherein the method further comprises:
    analyzing each frame recorded by a camera and rapidly acquiring a set of image features for the incoming image frame; comparing the acquired features to the stored set of features; and
    calculating a homography matrix using features that provide a good match between the current and stored feature sets via the lateral displacement and azimuthal rotation between the acquired features and stored features.

13. The system of claim 1, wherein the system acquires a burst of ~100 full resolution (2048×2048) frames at a rate of 90 frames per second.

14. The system of claim 1, wherein each illuminator of the plurality of illuminators project approximately F/2 beams.

* * * * *